US008475252B2

(12) United States Patent
Savage et al.

(10) Patent No.: US 8,475,252 B2
(45) Date of Patent: Jul. 2, 2013

(54) MULTI-PLAYER GAMES WITH INDIVIDUAL PLAYER DECKS

(75) Inventors: Daymon B. Savage, Las Vegas, NV (US); Roger M. Snow, Las Vegas, NV (US)

(73) Assignee: SHFL Entertainment, Inc., Las Vegas, NV (US)

( * ) Notice: Subject to any disclaimer, the term of this patent is extended or adjusted under 35 U.S.C. 154(b) by 1067 days.

(21) Appl. No.: 11/809,257

(22) Filed: May 30, 2007

(65) Prior Publication Data

US 2008/0300034 A1 Dec. 4, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .............................................. 463/11; 273/292

(58) Field of Classification Search
USPC ...................................................... 463/20, 22
See application file for complete search history.

(56) References Cited

U.S. PATENT DOCUMENTS

| | | | | |
|---|---|---|---|---|
| 1,885,276 A | | 11/1932 | McKay | |
| 2,001,220 A | | 5/1935 | Smith | |
| 2,016,030 A | | 10/1935 | Woodruff et al. | |
| 2,778,644 A | | 1/1955 | Stephenson | |
| 2,950,005 A | | 8/1960 | MacDonald | |
| 3,595,388 A | | 7/1971 | Castaldi | |
| 3,595,987 A | | 7/1971 | Vlahos | |
| 3,796,433 A | * | 3/1974 | Fraley et al. | 463/12 |
| 3,897,954 A | | 8/1975 | Erickson et al. | |
| 4,007,487 A | | 2/1977 | Vlahos | |
| 4,026,555 A | | 5/1977 | Kirschner et al. | |
| 4,100,569 A | | 7/1978 | Vlahos | |
| 4,344,085 A | | 8/1982 | Vlahos | |
| 4,388,994 A | | 6/1983 | Suda et al. | |
| 4,397,509 A | | 8/1983 | Miller et al. | |
| 4,445,114 A | | 4/1984 | Stubben | |
| 4,497,488 A | | 2/1985 | Plevyak | |
| 4,508,353 A | | 4/1985 | Meyer et al. | |
| 4,512,580 A | | 4/1985 | Matviak | |

(Continued)

FOREIGN PATENT DOCUMENTS

| | | |
|---|---|---|
| JP | 2660586 | 6/1997 |
| WO | WO8700764 A1 | 2/1987 |
| WO | WO 00/30856 | 6/2000 |
| WO | WO 00/51076 | 8/2000 |

OTHER PUBLICATIONS

Online Casino Poker Blackjack. "Blackjack Payout Schedule winning hands odds," http://www.online-casinos-poker-blackjack.com/casino_games/blackjack/payout-schedule.html, Created Apr. 4, 2004, Accesed Aug. 25, 2009.*

*Primary Examiner* — Omkar Deodhar
*Assistant Examiner* — Reginald Renwick
(74) *Attorney, Agent, or Firm* — TraskBritt

(57) ABSTRACT

An automatic multiple player gaming machine includes a central game processor and multiple player terminals, wherein each player terminal includes a player input and a player display. The gaming machine also includes a common game display and a game program residing in the processor, wherein the game program executes an interactive multiple player game. The processor further displays individual hands of cards on each player display, wherein each hand of cards is randomly selected from its own set of cards. The operation of such a machine may be effected in a computer-based method as well.

19 Claims, 12 Drawing Sheets

U.S. PATENT DOCUMENTS 4,513,969 A 4/1985 Samsel, Jr.
4,515,367 A 5/1985 Howard
4,530,499 A 7/1985 Breslow et al.
4,586,712 A 5/1986 Lorber
4,614,342 A 9/1986 Takashima
4,643,421 A 2/1987 Meyer et al.
4,658,427 A 4/1987 Aubin
4,659,082 A 4/1987 Greenberg
4,662,637 A 5/1987 Pfeiffer
4,667,959 A 5/1987 Pfeiffer et al.
4,687,200 A 8/1987 Shirai
4,724,307 A 2/1988 Dutton et al.
4,738,451 A 4/1988 Logg
4,759,448 A 7/1988 Kawabata
4,770,421 A 9/1988 Hoffman
4,807,884 A 2/1989 Breeding
4,876,000 A 10/1989 Mikhail
4,887,819 A 12/1989 Walker
4,926,327 A 5/1990 Sidley
4,969,648 A 11/1990 Hollinger et al.
4,995,615 A 2/1991 Cheng
5,000,453 A 3/1991 Stevens et al.
5,090,708 A 2/1992 Gerlitz et al.
5,120,057 A 6/1992 Kitaue
5,121,921 A 6/1992 Friedman et al.
5,125,671 A 6/1992 Ueda et al.
5,149,104 A 9/1992 Edelstein
5,150,899 A 9/1992 Kitaue
5,159,549 A 10/1992 Hallman, Jr. et al.
5,221,083 A 6/1993 Dote
5,240,140 A 8/1993 Huen
5,248,142 A 9/1993 Breeding
5,288,078 A 2/1994 Capper et al.
5,317,505 A 5/1994 Karabed et al.
5,356,145 A 10/1994 Verschoor
5,374,061 A 12/1994 Albrecht
5,382,024 A 1/1995 Blaha
5,414,256 A 5/1995 Gurner et al.
5,431,399 A 7/1995 Kelley
5,453,758 A 9/1995 Sato
5,470,080 A 11/1995 Naka et al.
5,521,616 A 5/1996 Capper et al.
5,586,766 A 12/1996 Forte et al.
5,586,936 A 12/1996 Bennett et al.
5,605,334 A 2/1997 McCrea, Jr.
5,616,078 A 4/1997 Oh
5,632,483 A 5/1997 Garczynski et al.
5,653,444 A * 8/1997 Dahl ............................ 273/274
5,669,816 A 9/1997 Garczynski et al.
5,676,372 A 10/1997 Sines et al.
5,681,039 A 10/1997 Miller
5,683,085 A 11/1997 Johnson et al.
5,688,174 A 11/1997 Kennedy
5,695,189 A 12/1997 Breeding et al.
5,722,893 A 3/1998 Hill et al.
5,726,706 A 3/1998 Walsh
5,735,742 A 4/1998 French
5,745,166 A 4/1998 Rhodes et al.
5,779,546 A 7/1998 Meissner et al.
5,781,647 A 7/1998 Fishbine et al.
5,803,453 A 9/1998 Stephan et al.
5,831,527 A 11/1998 Jones, II et al.
5,879,235 A 3/1999 Kaneko et al.
5,897,235 A 4/1999 Honma
5,919,090 A 7/1999 Mothwurf
5,923,364 A 7/1999 Rhodes et al.
5,934,998 A 8/1999 Forte et al.
5,941,769 A 8/1999 Order
5,944,310 A 8/1999 Johnson et al.
5,961,121 A 10/1999 Brown
5,976,019 A 11/1999 Ikeda et al.
5,989,122 A 11/1999 Roblejo
6,019,368 A 2/2000 Sines et al.
6,039,650 A 3/2000 Hill
6,068,258 A 5/2000 Breeding et al.
6,093,103 A 7/2000 McCrea, Jr.
6,117,012 A 9/2000 McCrea, Jr.
6,126,166 A 10/2000 Lorson et al.
6,139,014 A 10/2000 Breeding et al.
6,149,154 A 11/2000 Grauzer et al.
6,154,131 A 11/2000 Jones, II et al.
6,165,069 A 12/2000 Sines et al.
6,213,310 B1 4/2001 Wennersten et al.
6,217,447 B1 4/2001 Lofink et al.
6,250,632 B1 6/2001 Albrecht
6,254,096 B1 7/2001 Grauzer et al.
6,267,248 B1 7/2001 Johnson et al.
6,270,404 B2 8/2001 Sines et al.
6,299,536 B1 10/2001 Hill
6,313,871 B1 11/2001 Schubert
6,325,373 B1 12/2001 Breeding et al.
6,361,044 B1 3/2002 Block et al.
6,382,628 B2 * 5/2002 Stern ............................ 273/292
6,394,898 B1 5/2002 Nagao et al.
6,403,908 B2 6/2002 Stardust et al.
6,460,848 B1 10/2002 Soltys et al.
6,466,220 B1 10/2002 Cesana et al.
6,469,747 B1 10/2002 Rai et al.
6,517,436 B2 2/2003 Soltys et al.
6,519,283 B1 2/2003 Cheney et al.
6,520,857 B2 2/2003 Soltys et al.
6,527,271 B2 3/2003 Soltys et al.
6,530,836 B2 3/2003 Soltys et al.
6,530,837 B2 3/2003 Soltys et al.
6,532,297 B1 3/2003 Lindquist
6,533,276 B2 3/2003 Soltys et al.
6,533,662 B2 3/2003 Soltys et al.
6,568,678 B2 5/2003 Breeding et al.
6,579,180 B2 6/2003 Soltys et al.
6,579,181 B2 6/2003 Soltys et al.
6,588,751 B1 7/2003 Grauzer et al.
6,595,857 B2 7/2003 Soltys et al.
6,607,443 B1 8/2003 Miyamoto et al.
6,629,894 B1 10/2003 Purton
6,638,161 B2 10/2003 Soltys et al.
6,651,981 B2 11/2003 Grauzer et al.
6,651,982 B2 11/2003 Grauzer et al.
6,651,985 B2 11/2003 Sines et al.
6,652,379 B2 11/2003 Soltys et al.
6,655,684 B2 12/2003 Grauzer et al.
6,658,750 B2 12/2003 Scheibner et al.
6,661,425 B1 12/2003 Hiroaki
6,663,490 B2 12/2003 Soltys et al.
7,128,651 B2 10/2006 Miyamoto et al.
2002/0160825 A1 * 10/2002 Nicastro et al. ................ 463/16
2002/0169013 A1 11/2002 Serizawa et al.
2003/0199316 A1 10/2003 Miyamoto et al.
2004/0053655 A1 * 3/2004 Hyams et al. .................. 463/12
2004/0087355 A1 * 5/2004 Toyoda .......................... 463/16
2005/0242500 A1 11/2005 Downs, III
2007/0075494 A1 * 4/2007 Abbott .......................... 273/274
2008/0045327 A1 * 2/2008 Kuhn et al. .................... 463/22

* cited by examiner

MMP Game Display

MULTI-PLAYER GAMES WITH INDIVIDUAL PLAYER DECKS

TECHNICAL FIELD

The present invention relates to wagering games and, more particularly, wagering games that involve playing cards.

BACKGROUND

Wagering games involving cards, such as blackjack and the numerous variants of poker, have long been offered at casinos and similar establishments. In some instances, such games involve physical cards and chips and actions by dealers and other live participants. In other instances, much of the action is simulated by a computer such that dealing, wagering, and payouts are handled electronically and participants may be located distant from one another.

One consistent feature in many of these card-wagering games is that the cards, which each player (and possibly the dealer) is dealt, come from a common set of cards. This set of cards can be a single deck or can be multiple decks that are typically arranged in a shoe or similar apparatus. For example, when playing blackjack, when a player is dealt a particular card, then that card is no longer in the pool of cards available to be dealt to the other players and/or the dealer.

There are undesirable consequences that stem from this common feature of many card-wagering games. First, some jurisdictions have or are considering regulations prohibiting card-wagering games that operate as just described. For example, gaming regulators in New Jersey and Pennsylvania prohibit games whose outcomes for one player has an impact on another player. Thus, traditional blackjack is prohibited under such regulations.

Second, the congenial and friendly atmosphere of a game can be adversely impacted by the actions of various players in such card games. In standard blackjack it is not uncommon for a player to take a hit card when an ideal strategy would dictate that the player should instead “stand.” When the next player takes a “hit” and receives a card that does not favorably advance his hand, and wishes he instead received the previous player’s hit card, he may blame the first player, thereby undermining the atmosphere at the table.

Thus, there remains the unmet need for a card-wagering game that limits the impact of one player’s outcomes on those of the other players.

BRIEF SUMMARY OF THE INVENTION

Accordingly, one embodiment of the present invention relates to an automatic multiple player gaming machine that includes a central game processor and multiple player terminals, wherein each player terminal includes a player input and a player display. The gaming machine also includes a common game display and a game program residing in the central game processor, wherein the game program is configured to cause the processor to execute an interactive multiple player game. The processor further displays individual hands of cards on each player display, wherein each hand of cards is randomly selected from its own individual set of cards.

Another embodiment of the present invention relates to a method of providing a card-wagering game. In accordance with this method, a respective plurality of cards is randomly dealt to one or more players, wherein each respective plurality of cards is selected from a separate set of cards for each player. A respective wager is received from a subset of the one or more players and, then, according to rules of the card-wagering game, a particular player of the subset of players is determined who has a winning hand based at least in part on their respective plurality of cards. Furthermore, a payout amount is provided to at least that particular player according to a payout schedule associated with the card-wagering game.

An additional embodiment of the invention relates to another method of dealing a plurality of hands of cards in a multiplayer card-wagering game. In accordance with this method, a respective set of cards is associated with each player in the multiplayer card-wagering game and, then, a respective hand of cards is dealt to each of the players in the multiplayer card-wagering game, wherein each respective hand is randomly selected from the set of cards respectively associated with that player.

It is understood that other embodiments of the present invention will become readily apparent to those skilled in the art from the following detailed description, wherein it is shown and described by only various embodiments of the invention by way of illustration. As will be realized, the invention is capable of other and different embodiments and its several details are capable of modification in various other respects, all without departing from the spirit and scope of the present invention. Accordingly, the appended drawings and the detailed description of the invention are to be regarded as illustrative in nature and not as restrictive. As used herein, the term “exemplary” is used to mean “one example out of many” and is not intended to mean “the best” or “outstanding.”

DETAILED DESCRIPTION OF THE INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention. It should be first understood that in the description of the practices, methods, components, subcomponents and apparatus of the present invention, the examples and specific materials identified are merely exemplary and are not intended to be taken as limitations in the practice of the invention. For example, any computer language may be used, any operating system may be used, any commercial or specially designed hardware that can perform the identified functions and provides the described properties can be used, even if the specific component described is or is not a preferred embodiment of the invention.

In the following description, aspects of the various embodiments of the present invention are first discussed; followed by two examples of an inventive principle applied to specific card-wagering games. Finally, a detailed description is provided of an automated, interactive multiplayer game platform that supports various embodiments of the present invention.

Figure 1:
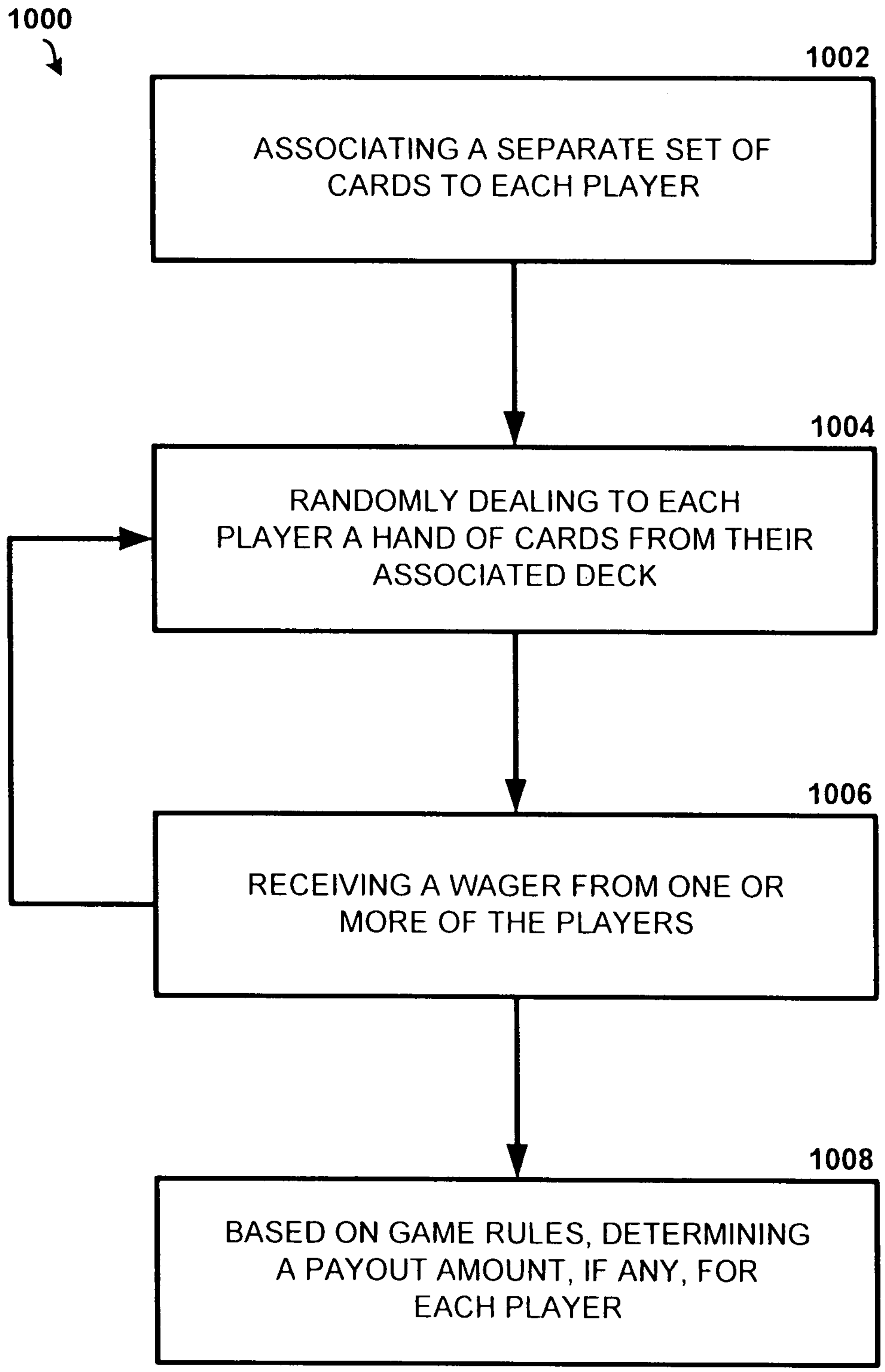
FIG. 1 depicts a flowchart of an exemplary method for playing a card-wagering game in accordance with the principles of the present invention.

FIG. 1 depicts a flowchart 1000 of an exemplary method of providing a card-wagering game in accordance with an exemplary embodiment of the present invention. All or some of the steps of this flowchart 1000 may be performed by a person or by a computer. Wagering and payouts may involve using any combination of physical chips, tokens, or money or, alternatively, may involve electronic accounts and simulated chips or tokens. Also, there may be additional steps in some particular games that are not explicitly shown in the flowchart 1000 such as, for example, steps involving dealing cards to a dealer. One of ordinary skill will recognize that adding one or more additional steps or repetition of some of the depicted steps may be performed without departing from the scope of the present invention.

In step 1002, a separate set of cards is associated with each player participating in a card-wagering game. By "separate," it is meant that each respective set of cards associated with a player is distinct from the set of cards that is associated with another player. For example, each player may have their own individual deck or each player may have multiple decks associated with that player. The set of cards may initially consist of one or more full decks or, alternatively, consist of partial decks. Also, in some games it is beneficial for each of the separate sets of cards to initially start with the same card population (e.g., every separate set would have four full decks without any jokers). It is clearly preferable that each set of cards for each player have the same card composition. By manipulating the composition of the separate sets of cards, the odds of the game can be changed. Once each player has an assigned, associated set of cards, each player is dealt, in step 1004, an initial, random hand of cards. Electronically, the randomness can be provided using a computer-controlled algorithm, while in a mechanical arrangement; the randomness can be accomplished, for example, using an automatic shuffler for each separate set of cards. Such a shuffler is commercially available and one example of such a shuffler is described in more detail in U.S. Pat. No. 6,149,154. In some games, a round of wagering may take place before the initial hands of cards are dealt and in other games, the starting wagers may be placed after the initial hands are dealt. Embodiments of the present invention contemplate either such arrangement.

Regardless of when initial wagering occurs, a wager is received, in step 1006, from one or more of the players that want to continue playing the game after the initial hands are dealt. According to the particular game rules, the steps of dealing cards and wagering may take place multiple times until a winning hand can be determined. Furthermore, although not explicitly depicted in the flowchart 1000, additional cards may be dealt to a dealer as community cards to be available to all the players or as other specialized cards, such as bonus cards, match cards, extra hands and the like. As explained in more detail in the examples to follow, the dealer cards and community cards may come from a separate set of cards and may impact what cards are available in each of the players' sets of cards. Notwithstanding how many rounds of dealing or wagering take place, or how a dealer or community hand of cards is created, each player's hand of cards is dealt from his own separate set of cards.

Once all the rounds of dealing cards and wagering are completed, any payout amounts, if any, are determined, in step 1008, for each player. In certain games such as variants of blackjack, the payout is determined between each player and the dealer. In community games such as poker, the payout may be determined based on a comparison of every player's hand or by comparing players' hands to a schedule of predetermined winning hands. Regardless of how the game outcome is determined, the results and payout amounts are determined according to the rules of the particular card-wagering game that is being played.

Figure 2A:
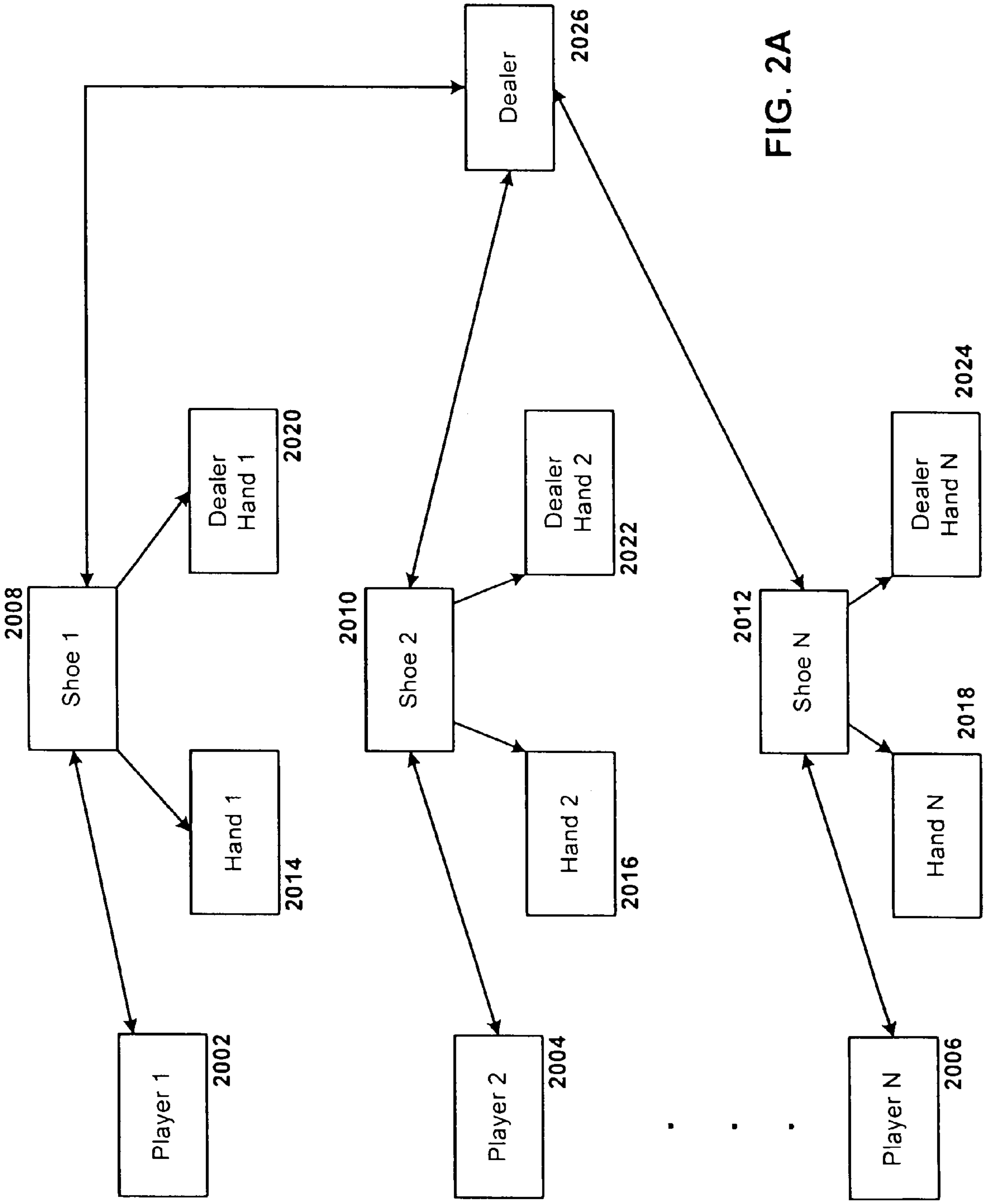
FIG. 2A depicts a conceptual diagram of a blackjack game administered in accordance with the principles of the present invention.

FIG. 2A depicts a conceptual view of a blackjack variant that is played according to the principles of the present invention. As mentioned earlier, some or all of the steps and apparatus depicted in FIG. 2A may be implemented using computer simulated gaming platforms.

The rules of blackjack are relatively simple to learn. The cards two to nine have a numerical value equal to the number printed on each card. Tens also have a numerical value equal to the number printed on the card (10, of course). All face cards (jack, queen and king) have a value of 10. Aces (A) may be counted as either 11 or 1.

A dealer plays against a number of players, typically from one to seven. Every player and the dealer receive initially two cards each, dealt by the dealer from a shoe holding multiple decks of cards. Each player's hand is played against the dealer's hand only. If a player's hand has a value closer to 21 (without going over) than the dealer's hand, the player wins. The best possible hand is known as a "blackjack" (twenty-one in the first two cards). This hand consists of an A (ace) and a ten-valued card (10, J, Q, K). The payout for a blackjack is 3-to-2: the player is paid three chips for every two chips bet. When both the player and the dealer have blackjacks, it is a normal tie (push) situation; the player retains the initial bet.

The player has several choices after receiving the first two cards.

1) Hit or draw: Take one or more cards to add-up to a better hand.
2) Stand: Stop taking more cards.
3) Double down: Double the initial amount wagered (in cases where a dealt hand is considered more favorable).
4) Split pairs: If the two cards are equal in value, they may be played as separate hands. Some casinos restrict the splitting of pairs to only certain pairs, such as tens.

Figure 2B:
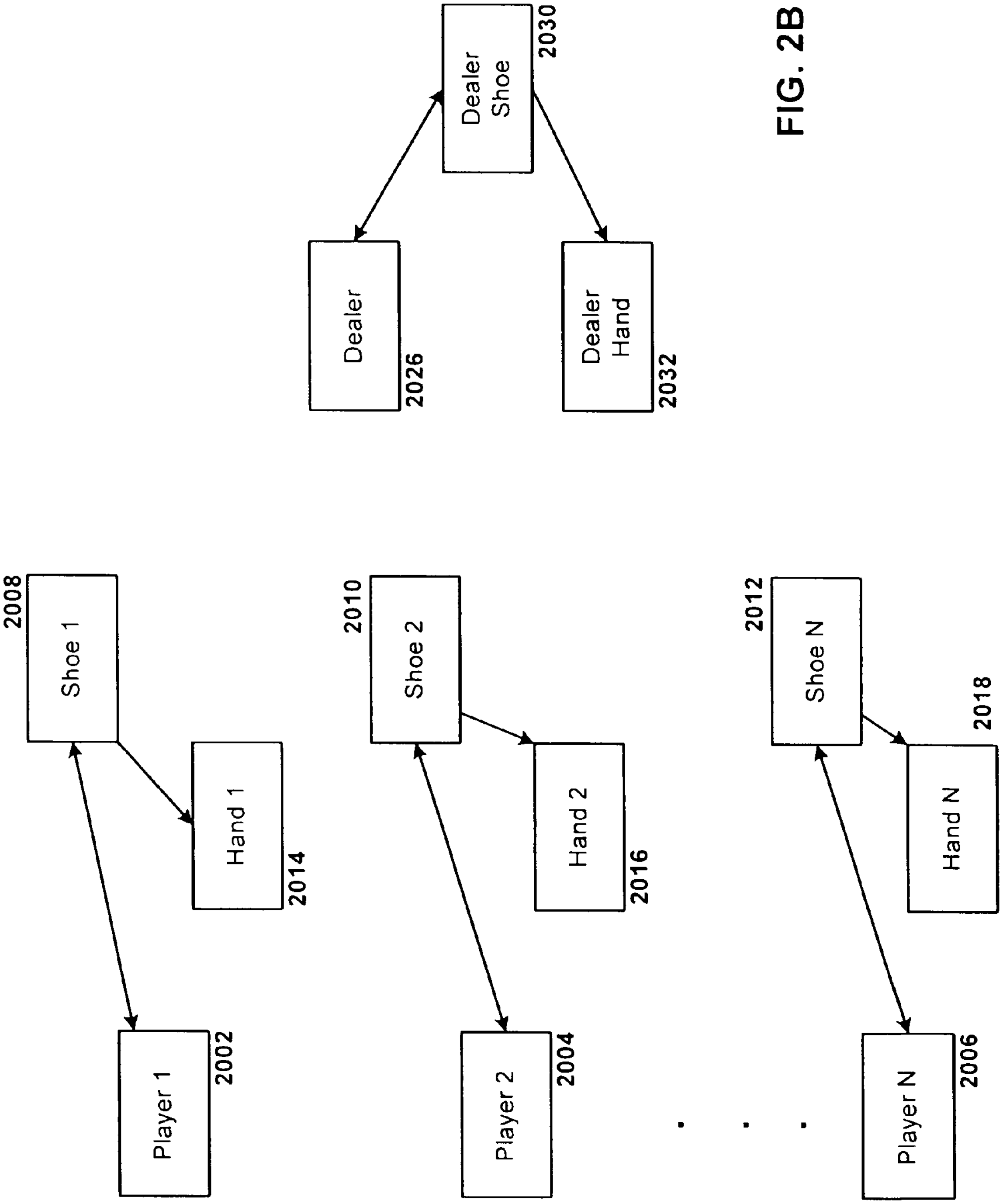
FIG. 2B depicts a conceptual diagram of an alternative blackjack game administered in accordance with the principles of the present invention.

The blackjack game depicted conceptually in FIGS. 2A and 2B follows these same basic rules with some modifications as discussed below. In the following example, each player and the dealer plays a separate game of blackjack from a shoe dedicated to the player/dealer pair. Each of the players 2002, 2004, 2006 has associated with them a distinct and separate shoe of cards 2008, 2010, 2012. Thus, for player number one 2002, his hand 2014 is dealt from his associated shoe 2008. While the hand 2016 of player number two 2004 is dealt from his particular shoe 2010.

The dealer 2026 has a separate hand 2020, 2022, 2024 that is also dealt from each respective player shoe 2008, 2010, 2012. The determination of any payout amounts is made relative to each player hand 2014, 2016, 2018 and its related dealer hand 2020, 2022, 2024. As a result, the cards that are dealt to each of the players 2002, 2004, 2006 (and the dealer 2026) do not have any effect on the hand dealt to any of the other players. In other words, even though player number one 2002 is dealt a particular card from his shoe 2008, this has no effect on whether player number two 2004 can be dealt the same card from his shoe 2010. Accordingly, players no longer have any reason to blame other players on a bad game outcome.

In the next example, the dealer hand is dealt from a dedicated dealer shoe and each player plays against the same hand. Similar to FIG. 2A, a blackjack game is conceptually shown in FIG. 2B as well. In this instance, the dealer 2026 is provided with his own separate dealer shoe 2030 of cards. It is from this dealer shoe 2030 of cards that the dealer is dealt his hand 2032. In play, this single dealer hand 2032 is played against each of the player hands 2014, 2016, 2018. Otherwise, the game is the same as that described in FIG. 2A. According to one embodiment, all cards dealt from dealer shoe 2030 are removed from each player shoe 2008, 2010, 2012. In other embodiments, dealt dealer cards are not removed.

In a third embodiment, the dealer cards are removed from one of the player shoes. Once the dealer cards are removed, those same cards are removed from each player's specific shoe. In this manner, all players play against the same dealer hand and none of the player's specific shoes hold the cards that are used to form the dealer's hand.

The number of cards used to play out a typical hand varies depending on the number of hit cards taken. However, if the number of cards in each shoe is relatively large (e.g., eight decks) compared to the number of cards played, the odds of these blackjack variations are substantially the same as a traditional blackjack game.

Figure 3:
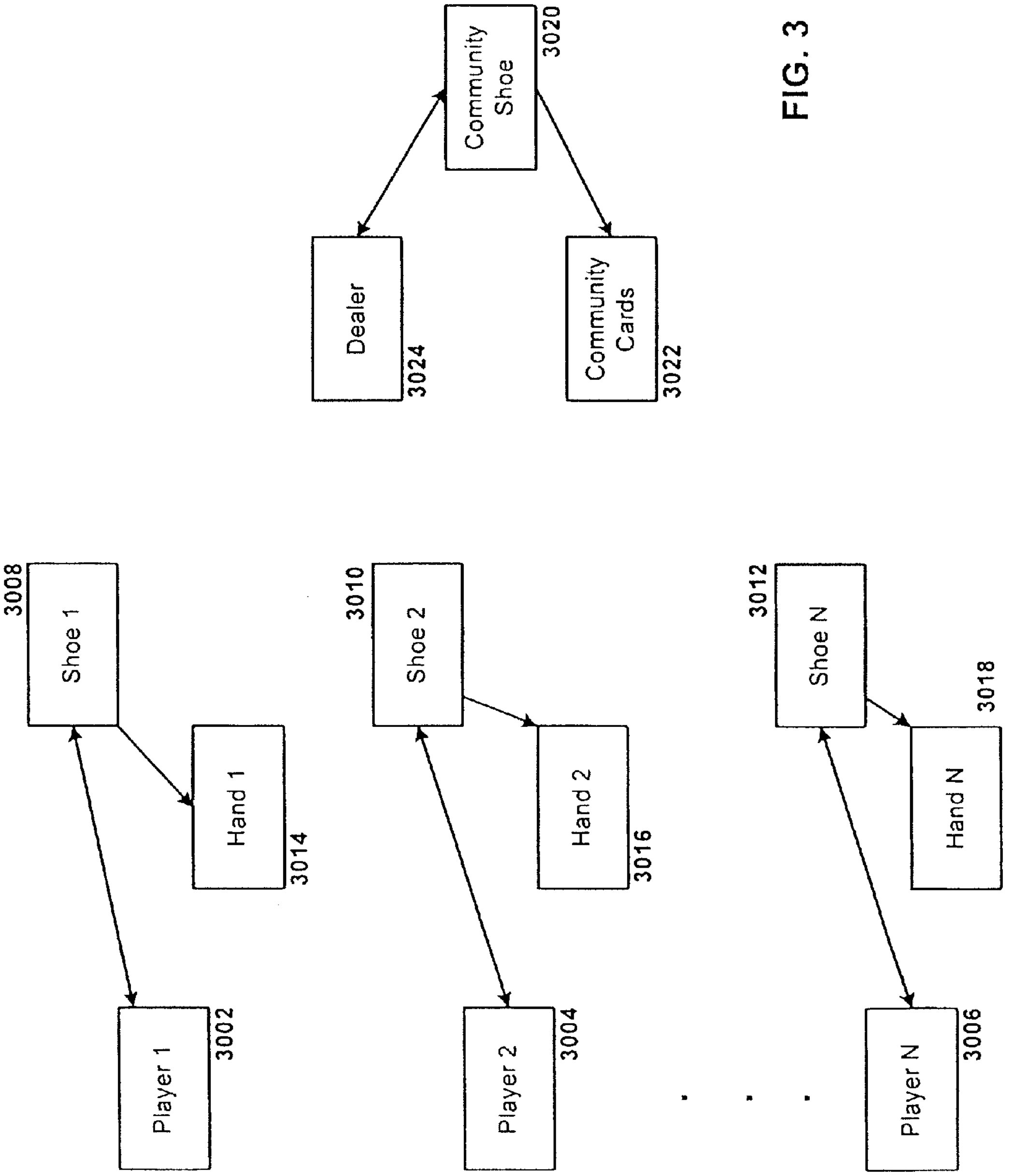
FIG. 3 depicts a conceptual diagram of a poker game administered in accordance with the principles of the present invention.

FIG. 3 is a conceptual diagram of a game having community cards, such as poker. Unlike blackjack, poker is typically a single deck game. Each player hand, therefore, is randomly selected from a dedicated single deck of cards. As would be appreciated by one of ordinary skill, the principles of the present invention are applicable to a variety of different poker games. For example, the rounds of wagering, the ante rules, the number of community cards, the number of cards making a complete hand, and other rules can be varied without departing from the scope of the present invention. While such changes may result in different probabilities for different hands and, therefore, different payout expectations, these changes do not impact the practice of the principles of the present invention in these different games.

In the poker example of FIG. 3, each player 3002, 3004, 3006 has an associated set of cards arranged in a respective separate stack. For purposes of simplicity, this stack will be referred to as a "shoe" 3008, 3010, 3012. From these shoes 3008, 3010, 3012, a respective hand 3014, 3016, 3018 is randomly dealt to each player 3002, 3004, 3006. In one example, each player 3002, 3004, 3006 is dealt two cards, viewable only by the player receiving the cards.

A dealer 3024 has a separate community shoe 3020 that provides community cards 3022 (or a separate dealer hand) for all the players 3002, 3004, 3006. In an alternative embodiment, the community cards are dealt from a player shoe and those cards are also removed from each of the other player shoes.

In one exemplary approach, each player 3002, 3004, 3006 may first be dealt two cards from their respective shoes 3008, 3010, 3012. After a round of wagering, the dealer 3024 may deal a card from the community shoe 3020. The wagering and dealing from the community shoe 3020 may repeat for a number of rounds. For example, five community cards 3022 may be dealt such that each player can build a five-card hand using the best combination resulting from their two cards and the five community cards 3022. The exact nature of "dealing" the community cards 3022 may be accomplished in different ways. For example, rather than the traditional dealing of the community cards 3022 one at a time after each wagering round, the community cards 3022 may be initially retrieved from the community shoe 3020 and dealt face-down before any player cards are dealt. After each round of wagering, one of the community cards is then revealed to the players 3002, 3004, 3006. Thus, creating an appearance that the community cards 3022 are being dealt, as in a conventional poker table game.

In one embodiment, cards dealt to the community card area (or to a dealer hand) are removed from the player shoes, so that the same known game outcomes occur. In other embodiments, no cards are removed, making new hands such as five of a kind possible.

The winning player is determined according to the specific rules of the game and is typically awarded the entire pot with some portion designated to the casino or establishment administering the game. In one particular example, the five-card hands remaining in play after wagering is completed are compared to one another to determine the highest hand. In typical five-card poker hands, the hand rankings (from highest to lowest) are: royal flush, straight flush, four of a kind, full house, flush, straight, three of a kind, two pair, one pair, no pair. However, these rankings can be varied with some games even rewarding the "lowest" ranking rather than the highest.

Although not shown in either FIG. 2 or FIG. 3, cards may need to be discarded in the event that physical cards are being used. Accordingly, a discard tray for each player and/or the dealer may be used to provide this functionality.

As will be recognized, there is the possibility that because of the employment of separate shoes for each player and the community cards, dealer cards or other special cards, unconventional hands may be realized, such as five of a kind. To prevent such an occurrence, when prevention is desired, the community shoe 3020 and the individual shoes 3008, 3010, 3012 may be logically linked together. By linking the various shoes together, every time a particular card is dealt from the community shoe 3020, that same card can be removed from each of the simulated player shoes 3008, 3010, 3012.

In a game provided via a computer simulation, any community card retrieved or dealt from the community shoe 3020 may be automatically flagged as "unavailable" in each of the player shoes 3008, 3010, 3012 and thereby effectively removed from each of the player's shoes 3008, 3010, 3012. In a more mechanical implementation with a live dealer, the community shoe 3020 may be a card-reading shoe such that physical cards are read as they leave the community shoe 3020 to determine their rank and suit. By allowing the community shoe 3020 to communicate with a computer-based controller that controls the simulation of dealing cards from the player shoes 3008, 3010, 3012, any card manually dealt from the card-reading shoe can be removed from each of the simulated player shoes 3008, 3010, 3012. If the game is a live game utilizing physical cards, the card-reading shoe may be programmed to display an unavailable card. In the event a card is dealt to a player that is unavailable, the unavailability is indicated on a display and/or an audible alarm is sounded, indicating to the dealer to deal another card. Card-reading dealing shoes are commercially available and an exemplary card-reading dealing shoe is described in more detail in U.S. Patent Publication No. 2005/0242500.

Because each player 3002, 3004, 3006 has their own separate shoe 3008, 3010, 3012, the possibility of ties is increased over that of a more traditional poker game. In the case of ties, the winners typically split the pot. The possibility of "bad beats" (a good hand that still loses) is increased as well. Thus, in some embodiments it may be advantageous to eliminate "bad beat" payouts that have conventionally been awarded in such cases.

By providing a separate deck of cards to each player that is logically linked to a dealer or common card shoe, the dynamics of traditional poker games changes, such as in Texas Hold 'Em poker, for example. The game of Texas Hold 'Em does not allow for ties. Since community cards are used to form part of a hand, it is not possible to have a game outcome where two players hold a royal flush of different suits. Even when two players hold lower ranking hands, such as two three of a kind (all jacks), for example, the rank of the other cards breaks the tie.

When each player hand is dealt from separate decks of cards, it is possible for the players to hold an identical hand, thereby resulting in a tie. This possibility may have an impact on a player's tendency to "bluff" or go "all-in," for example, adding more interest to the game.

Exemplary Hardware Platform

The games of the present invention may be implemented as live table games, television or cable game show games, video poker gaming machine platforms, hand-held games for play, multiple player interactive wagering platform games (with kiosk formats, single player screens, community screens, and/or banks of seats for players with a common dealer screen), cell phone games, games downloadable from the interne, wireless games, parlor games, games executed by personal computers, palm pilots, play stations and the like. Each of the above game formats is contemplated by the present invention. Examples of known multiple player platforms are described in U.S. Pat. No. 6,607,443 and U.S. Pat. No. 7,128,651. The content of these two disclosures is hereby incorporated by reference in its entirety.

A gaming system that can be used to practice the method of the present invention comprises a table and a dealer "virtual" video display system positioned for view by players seated at the table. The table may seat at least two players up to the amount of players that can be configured about the table and have a view of the dealer video display system. Typically each gaming system will have at least four player available positions, with space determinations considered as to whether there would be four, five, six or seven player positions. It is possible to have a completely circular dealer display (e.g., holographic display in a cylindrical centerpiece) and have players distributed around the entire periphery, but this is too dissimilar to standard play arrangements and could slow the game down, as play should approximate that of a live game, with players playing in sequence. A surface of the table will include a generally continuous common display surface for showing community cards, dealer hands and any other cards or game pieces used to play the game for any purpose, optionally, player hands and, where there are touch screen player controls, for displaying the player touch screen controls. A majority of the table surface comprises a video monitor in one example of the invention. Where there are no touch screen controls, the table surface may include player control panels at each player station near the continuous common display surface. In another preferred embodiment, a platform includes a common display for displaying shared information and individual player displays for displaying information specific to one player, such as the player's hand, credit available, wagers made, play strategy, suggestions and the like.

The use of a large or continuous common display surface offers some significant advantages in simulating or recreating a standard card table surface. Cards may be readily viewed by other players at a table, which is standard in table games and adds to player enjoyment. Individual monitors, especially when slanted toward the individual players make such table-wide card reading difficult. The use of a common display also allows for better animation to be provided, such as displaying virtual images of cards moving to the player and "virtual" chips being placed on the table when wagers are indicated. For purposes of this disclosure, the term "virtual" means a graphical video representation of a real object or person, such as a dealer, cards and chips, for example.

The individual player positions preferably have a separate intelligence at each player position that accepts player input and communicates directly with a game engine (main game computer or processor). The intelligence is preferably an intelligent board that can process information. For purposes of this disclosure the term "intelligent" refers to the ability to execute code, either provided in the form of software, or hardware circuits, or both. Such processing may at least comprise some of signal converting (e.g., signals from player card readers, credit deposit, currency readers, coin readers, touch screen signals, and/or control panel signals) into a signal that can be included in an information packet and interpreted by the main game computer when the signal is sent.

Communication between the intelligence at each player position is direct to the main game computer and may be by self-initiated signal sending, sequenced polling by the main game computer (e.g., each position communicates directly to the main game computer in turn), timed communication, or any other order of communication that is direct between the intelligence and the main game computer.

One preferred form of communication between the main game computer and player station computers is by means of self-initiated signal sending. There is essentially a single main game computer that contains video display controls and programs for both the dealer display (i.e., the common display) and the table top display, audio controls and programs, game rules (including storage of multiple games if intended to be available on the machine), a random number generator, graphic images, game sequence controls, security systems, wager accounting programs, external signaling and audit functions, and the like. In other forms of the invention, the above functions are divided between a main processor and one or more additional processors. The intelligence at each player position speeds up the performance of all aspects of the game by being able to communicate directly with the main game computer and being able to process information at the player position rather than merely forwarding the information in raw form to the main game computer. Processing player information at the player positions frees up resources for use by the main processor or processors. The player station intelligence may also drive a player display.

A card game system may also include a suitable data and control processing subsystem that is largely contained within a main control module supported beneath the tabletop. The control and data processing subsystem includes a suitable power supply for converting alternating current from the power main as controlled by a main power switch. The power supply transforms the alternating line current to a suitable voltage and to a direct current supply. Power is supplied to a power distribution and sensor/activity electronics control circuit. Commercially available power switching and control circuits may be provided in the form of a circuit board that is detachable and plugs into a board receptacle of a computer mother board or an expansion slot board receptacle. A main game controller motherboard may include a central microprocessor and related components well known in the industry as computers using Intel Corp., Santa Clara, Calif., brand PENTIUM® microprocessors and related memory or intelligence from any other manufacturing source. A variety of different configurations and types of memory devices can be connected to the motherboard as is well known in the art. Of particular interest is the inclusion of two flat panel display control boards connected in expansion slots of the motherboard. Display control boards are each capable of controlling the images displayed for the dealer video display, the common display and may also control each of the player position display areas on the continuous display screen, if a continuous screen is used and other operational parameters of the video displays used in the gaming system. More specifically, the display control boards are connected to player bet interfaces circuits for the player stations. This arrangement also allows the display control boards to provide necessary image display data to the display electronic drive circuits associated with the dealing event program displays and the common display.

The motherboard and/or the individual player intelligent boards also includes a serial port that allows stored data to be downloaded from the motherboard to a central casino computer or other additional storage device. In one example, each player board communicates directly with the casino computer system. This allows card game action data to be analyzed in various ways using added detail, or by providing integration with data from multiple tables so that cheating schemes can be identified and eliminated, and player tracking systems can be maintained. Player performance and/or skill can be tracked at one table or as a compilation from gaming at multiple tables, as by using BLOODHOUND™ security software marketed by Shuffle Master, Inc., which may be incorporated into this automated gaming system. Additionally, player hand analysis can be performed. The motherboard and/or individual player intelligent boards may also have a keyboard connection port that can be used to connect a larger format keyboard to the system to facilitate programming and servicing of the system.

Although the preferred system shown does not require features illustrated for receiving automated player identification information, such features can alternatively be provided. Card readers such as used with credit cards, or other identification code reading devices can be added in the system to allow or require player identification in connection with play of the card game and associated recording of game action by one of the processors. Such a user identification interface, for example a card reader located at each player station, can be implemented in the form of a variety of magnetic card readers commercially available for reading user-specific identification information. The user-specific information can be provided on specially constructed magnetic cards issued by a casino, or magnetically coded credit cards or debit cards frequently used with national credit organizations such as VISA®, MASTERCARD®, AMERICAN EXPRESS®, casino player card registry, banks and other institutions. The information could also be provided on other writable media, such as an RFID chip with writable memory, or bar coding, as just a few examples.

Alternatively, it is possible to use so-called "smart cards" to provide added processing or data storage functions in addition to mere identification data. For example, the user identification could include coding for available credit amounts purchased from a casino. As a further example, the identification card or other user-specific instrument may include specially coded data indicating security information that would allow accessing or identifying stored security information that must be confirmed by the user after scanning the user identification card through a card reader. Security information might include such things as file access numbers that allow the central processor to access a stored security clearance code, which the user must indicate using input options provided on displays using touch screen displays. A still further possibility is to have participant identification using a fingerprint image, eye blood vessel image reader, or other suitable biological information device to confirm identity of the user that can be built into the table. Still further, it is possible to provide such participant identification information by having the pit personnel manually code in the information in response to the player indicating his or her code name or real name. Such additional identification could also be used to confirm credit use of a smart card or transponder. All or part of the functions dedicated to a particular player station are controlled by the player station intelligence in one form of the invention. Additionally, each player station intelligence may be in communication with a casino accounting system.

It should also be understood that the continuous display(s) can alternatively be provided with suitable display cowlings or covers that can be used to shield display of card images from viewing by anyone other than the player in games where that is desirable. This shielding can also be effected by having light-orientation elements on the control panel, and some of these light-orientation elements are electronically controllable. In this manner, the processor can allow general viewing of cards in games where that is desirable or tolerated, and then alter the screen where desired. These types of features can be provided by nanometer, micrometer or other small particulate or flake elements within a panel on the viewing area that are reoriented by signals from the processor. Alternatively, liquid crystal or photo chromatic displays can be used to create a screening effect that would allow only viewers at specific angles of view from the screen area to view the images of cards. Such an alternative construction may be desired in systems designed for card games different from blackjack, where some or all of the player or dealer cards are not presented for viewing by other participants or onlookers. Such display covers or cowlings can be in various shapes and configurations as needed to prevent viewing access. Alternatively, it may be acceptable to use a player-controlled switch that allows the display to be momentarily viewed and then turned off. The display can be shielded using a cover or merely by using the player's hands. Still further, it is possible to use a touch screen display that would be controlled by touch to turn on and turn off. Similar shielding can be used to prevent others from viewing the display.

A review of the figures will assist in a further understanding of an exemplary platform, which may support embodiments of the present invention.

Figure 4:
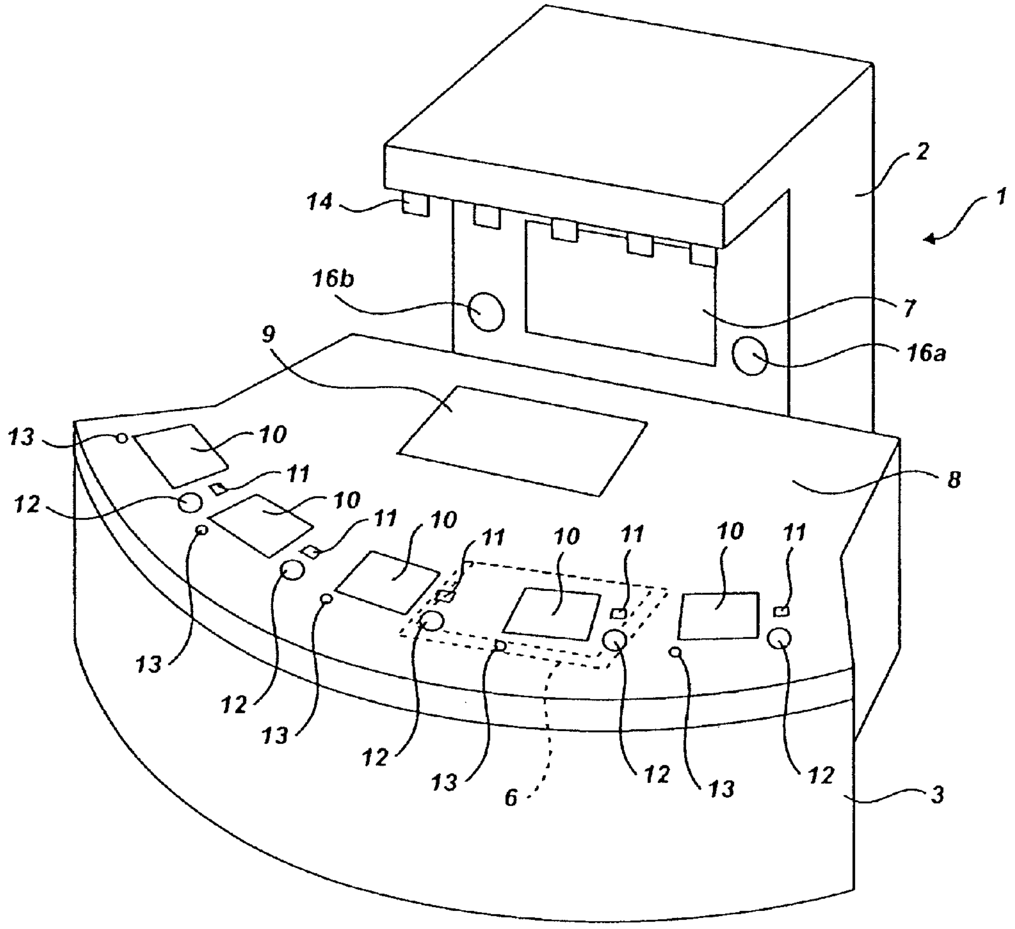
Fig. 4 Prior Art
FIG. 4 shows a perspective view of a prior art format for an automated gaming system.

FIG. 4 shows a fully automated gaming table 1 of the prior art, as disclosed in U.S. Pat. No. 7,128,651. Automated gaming table 1 comprises a vertical upright display cabinet 2 and a player bank or station cluster arrangement 3. The vertical display cabinet 2 has a viewing screen 7 on which images of the virtual dealer are displayed. A top 8 of the player bank arrangement 3 has individual monitor screens 10, one for each player position, as well as tabletop inserted coin acceptors 11, and player controls 12 and 13. There is a separate and larger common screen 9 on which dealer cards are displayed in a format large enough for all players to view. Speakers 16*a* and 16*b* are provided for sound transmission and decorative lights 14 are provided.

Figure 5:
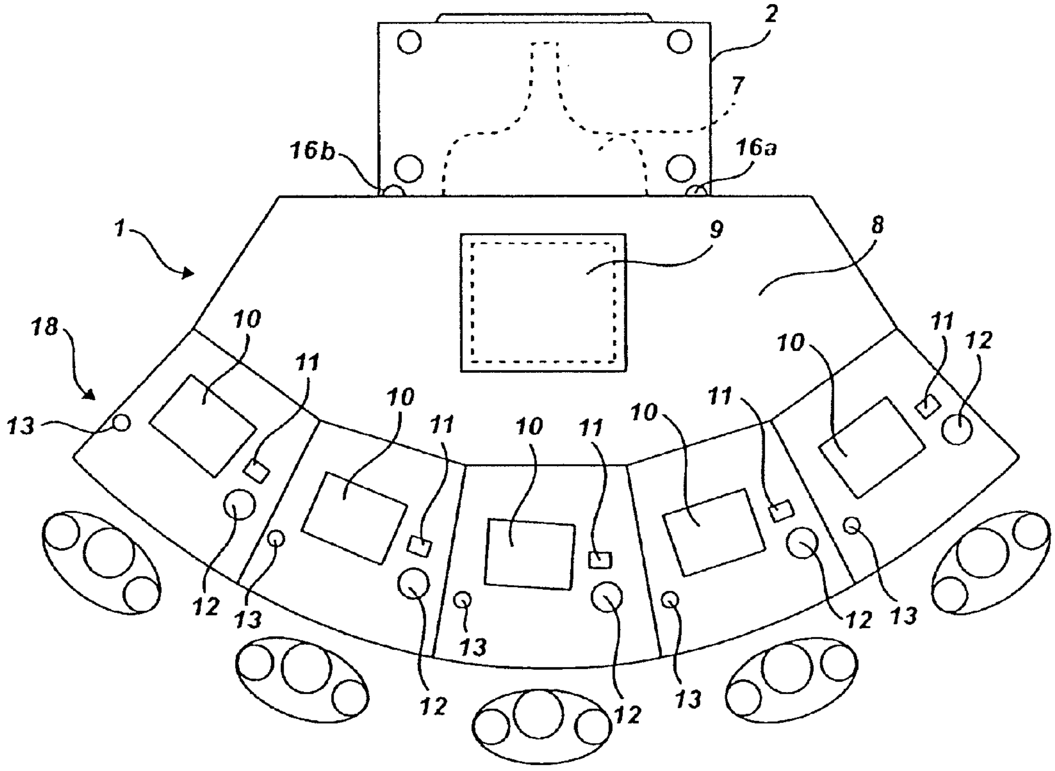
Fig. 5 Prior Art
FIG. 5 shows a top plan view of the prior art format for the automated gaming system as shown in FIG. 4.

FIG. 5 shows a top plan view of the same prior art automated gaming table 1 with the viewing screen 7, as shown by dashed lines shown more clearly as a CRT (Cathode Ray Tube) monitor. It can also be seen that each player position has to form an arc cut into the semicircular player seating area 18.

Figure 6:
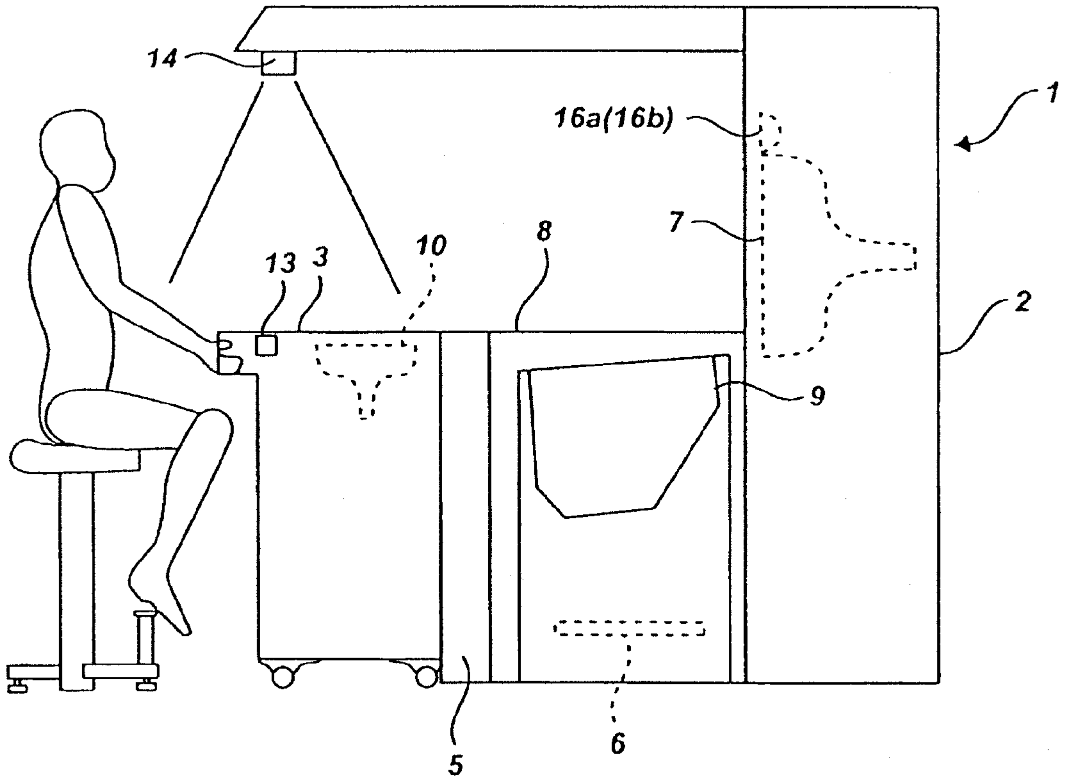
Fig. 6 Prior Art
FIG. 6 shows a side elevational view of the prior art format for the automated gaming system as shown in FIG. 4.

FIG. 6 shows a side elevational view of the same prior art automated gaming system of FIGS. 4 and 5 where an orientation of three different types of CRT monitor screens 7, 9 and 10 are shown.

Figure 7:
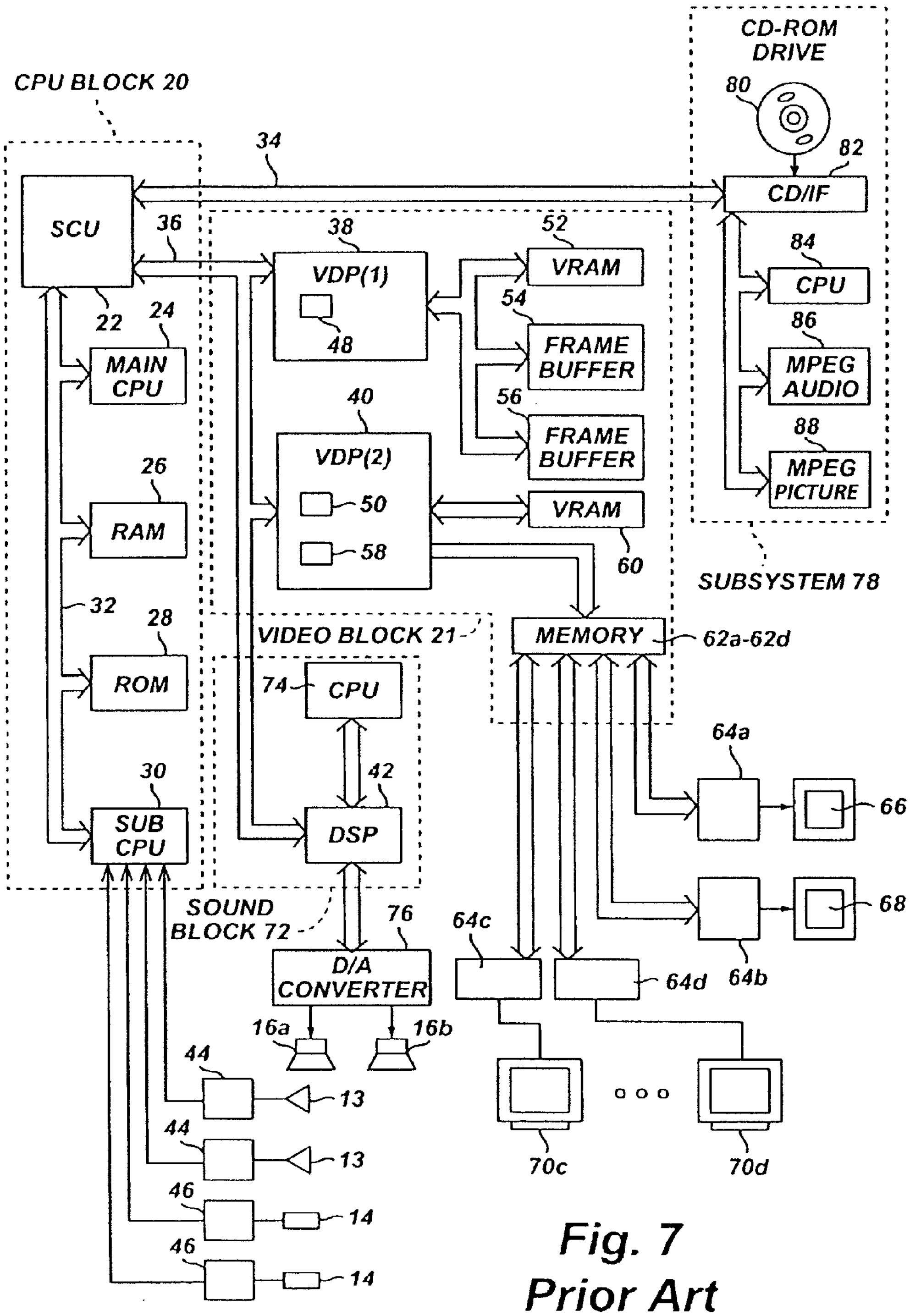
Fig. 7 Prior Art
FIG. 7 shows a block schematic of an electronic configuration of a prior art automated gaming system.

FIG. 7 shows the schematic circuitry of a prior art automated system as disclosed in the above-mentioned U.S. Pat. No. 7,128,651. FIG. 7 is a block diagram of processing circuitry in the automated gaming table 1 of FIG. 1. The processing circuitry comprises a CPU (Central Processing Unit) block 20 for controlling the whole system, a video block 21 for controlling the game screen display, a sound block 72 for producing effect sounds and the like, and a subsystem for reading out CD-ROM.

The CPU block 20 comprises an SCU (System Control Unit) 22, a main CPU 24, RAM (Random Access Memory) 26, ROM (Read-Only Memory) 28, a sub-CPU 30, and a bus 32. The main CPU 24 contains a math function similar to a DSP (Digital Signal Processing) so that application software can be executed rapidly.

The RAM 26 is used as the work area for the main CPU 24. The RAM 26 stores the initialization program used for the initialization process. The SCU 22 controls the buses 32, 34 and 36 so that data can be exchanged smoothly among the VDPs (video display processors) 38 and 40, the DSP 42, and other components.

The SCU 22 contains a DMA (Direct Memory Access) controller, allowing data (polygon data) for character(s) in the game to be transferred to the VRAM in the video block 21. This allows the game machine or other application software to be executed rapidly. The sub-CPU 30 is termed an SMPC (System Manager and Peripheral Control). Its functions include collecting sound recognition signals from the sound recognition circuit 44 or image recognition signals from the image recognition circuit 46 in response to requests from the main CPU 24. On the basis of sound recognition signals or image recognition signals provided by the sub-CPU 30, the main CPU 24 controls changes in the expression of the character(s) appearing on the game screen, or performs image control pertaining to game development, for example. The video block 21 comprises a first VDP (Video Display Processor) 38 for rendering TV game polygon data characters and polygon screens overlaid on the background image, and a second VDP 40 for rendering scrolling background screens, performing image synthesis of polygon image data and scrolling image data based on priority (image priority order), performing clipping, and the like. The first VDP 38 houses a system register 48, and is connected to a VRAM (DRAM) 52 and to two frame buffers 54 and 56. Data for rendering the polygons used to represent TV game characters and the like is sent to the first VDP 38 through the main CPU 24, and the rendering data written to the VRAM 52 is rendered in the form of 16- or 8-bit pixels to the rendering frame buffer 54 or 56. The data in the rendered frame buffer 54 or 56 is sent to the second VDP 40 during display mode. In this way, buffers 54 and 56 are used as frame buffers, providing a double buffer design for switching between rendering and display for each individual frame. Regarding information for controlling rendering, the first VDP 38 controls rendering and display in accordance with the instructions established in the system register 48 of the first VDP 38 by the main CPU 24 via the SCU 22.

The second VDP 40 houses a register 50 and color RAM 58, and is connected to the VRAM 60. The second VDP 40 is connected via the bus 36 to the first VDP 38 and the SCU 22, and is connected to picture output terminals Voa through Vod through memories 62*a* through 62*d* and encoders 64*a* through 64*d*. The picture output terminals Voa through Vod are connected through cables to the main game displays 66, 68 and satellite displays 70*c* and 70*d*.

Scrolling screen data for the second VDP 40 is defined in the VRAM 60 and the color RAM 58 by the main CPU 24 through the SCU 22. Information for controlling image display is similarly defined in the second VDP 40. Data defined in the VRAM 60 is read out in accordance with the contents established in the register 50 by the second VDP 40, and serves as image data for the scrolling screens that portray the background for the character(s). Image data for each scrolling screen and image data of texture-mapped polygon data sent from the first VDP 38 is assigned display priority (priority) in accordance with the settings in the register 48, and the final image screen data is synthesized.

Where the display image data is in palette format, the second VDP 40 reads out the color data defined in the color RAM 58 in accordance with the values thereof, and produces the display color data. Color data is produced for each display 66 and 68 and for each satellite display 70*c*, 70*d*. Where display image data is in RGB format, the display image data is used "as-is" as display color data. The display color data is temporarily stored in memories 62*a*-62*d* and is then output to the encoders 64*a*-64*d*. The encoders 64*a*-64*d* produce picture signals by adding synchronizing signals to the image data, which is then sent via the picture output terminals Voa through Vod to the displays 66, 68 and the satellite displays 70*c*, 70*d*. In this way, the images required to conduct an interactive game are displayed on the screens of the displays 66, 68 and the satellite displays 70*c*, 70*d*.

The sound block 72 comprises a DSP 42 for performing sound synthesis using PCM format or FM format, and a CPU 74 for controlling the DSP 42. Sound data generated by the DSP 42 is converted into two-channel sound signals by a D/A converter 76 and is then presented to audio output terminals Ao via interface (not shown). These audio output terminals Ao are connected to the input terminals of an audio amplification circuit (not shown). Thus, the sound signals presented to the audio output terminals Ao are input to the audio amplification circuit (not shown). Sound signals amplified by the audio amplification circuit drive the speakers 16*a* and 16*b*.

The subsystem 78 comprises a CD-ROM drive 80, a CD-I/F 82, and CPU 84, an MPEG-AUDIO section 86, and an MPEG-PICTURE section 88. The subsystem 78 has the function of reading application software provided in the form of a CD-ROM and reproducing the animation. The CD-ROM drive 80 reads out data from the CD-ROM. The CPU 84 controls the CD-ROM drive 80 and performs error correction on the data read out by it. Data read from the CD-ROM is sent via the CD-I/F 82, bus 34, and SCU 22 to the main CPU 24 that uses it as the application software. The MPEG-AUDIO section 86 and the MPEG-PICTURE section 88 are used to expand data that has been compressed in MPEG (Motion Picture Expert Group) format. By using the MPEG-AUDIO section 88 and the MPEG-PICTURE section 88 to expand data that has been compressed in MPEG format, it is possible to reproduce motion picture. It should be noted herein that there are distinct processors for the CPU block, video block, sound block, CD-ROM drive and Memory with their independent CPUs. This requires significant computing power and yet still has "dumb" (no intelligence) player input components.

Figure 8:
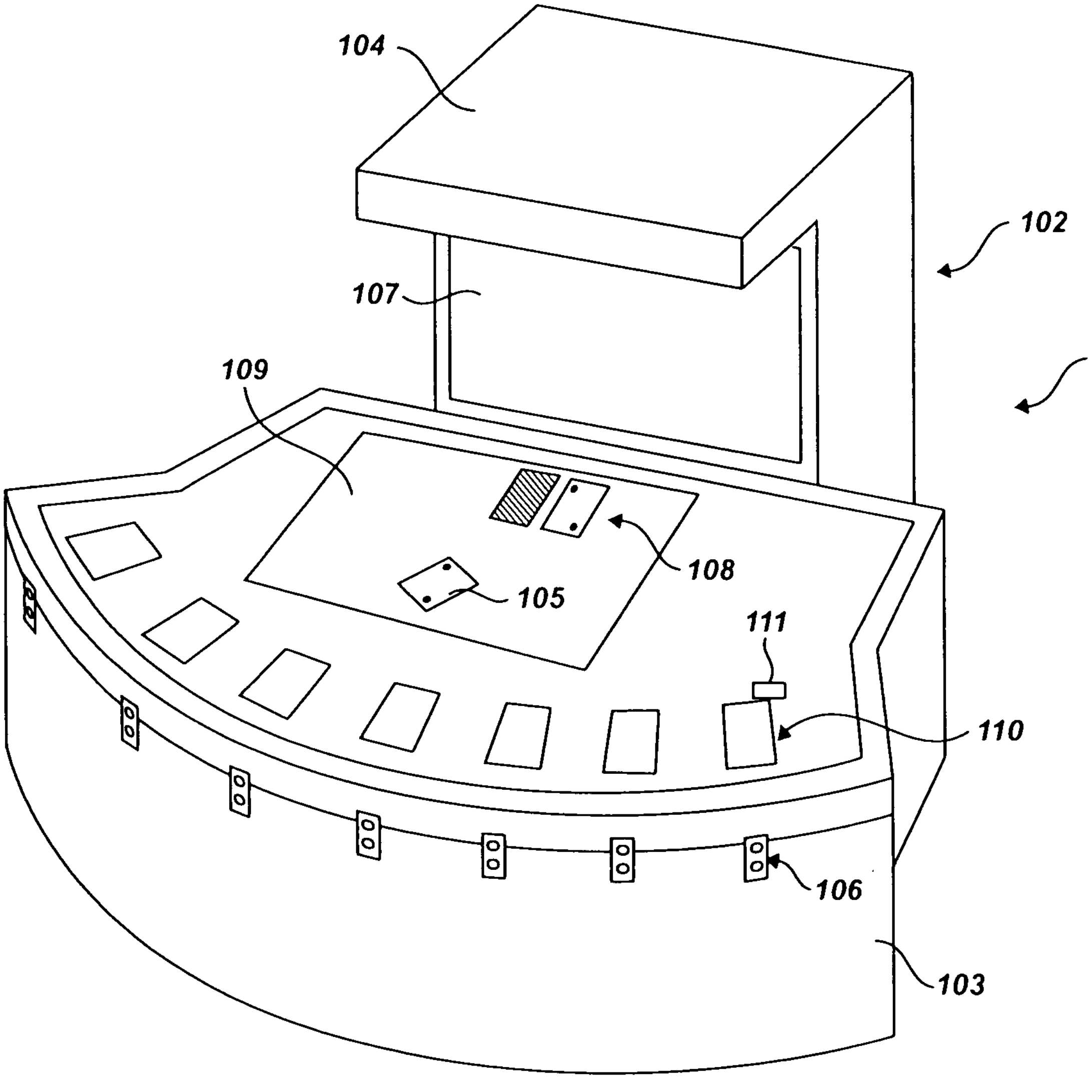
FIG. 8 shows a perspective view of a format for an automated gaming system according to the present invention.

FIG. 8 shows an example of an automated interactive multi player table system 101 useful to practice the game play methods of the present invention. The system 101 has an upright dealer display cabinet 102 with a top 104 and the dealer viewing screen 107, which may be any form of display screen such as a CRT, plasma screen, liquid crystal screen, LED screen or the like. The player bank arrangement 103 has a common display screen 109 that displays images of dealer cards being dealt 108, player cards 105 passing to player displays 110, wagers made, etc. Touch screen player input functions are provided on the player displays 110. Other player input functions may be provided on a panel 106 which might accept currency, coins, tokens, identification cards, player tracking cards, ticket in/ticket out acceptance, and the like.

Figure 9:
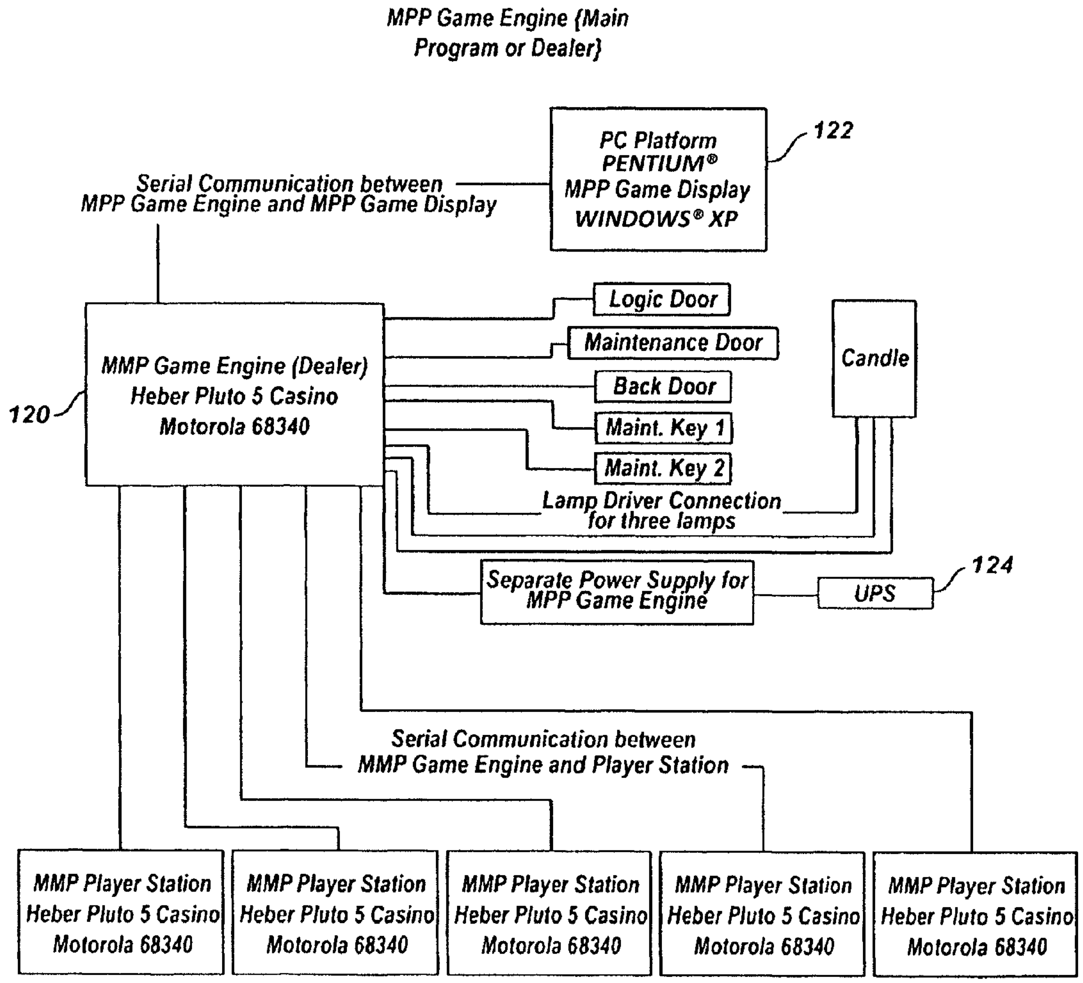
FIG. 9 shows a schematic diagram of a gaming engine useful in the practice of the present invention.

FIG. 9 shows an electronic/processor schematic for a MultiPlayer Platform (MPP) gaming system according to the presently described invention. The MPP Game engine (dealer) comprises a Heber Pluto 5 casino game board 120 (Motorola 68340 board) operating off the PC Platform PENTIUM® 4 MPP game display processor 122. The game display processor 122 operates on a WINDOWS® XP platform. The respective subcomponents on the PENTIUM® 4 processor are labeled to show the apportionment of activity on the motherboard and the component parts added to the board. As is shown, the game engine has an uninterruptible power supply 124. The game display processor 122 directs activity on the speakers, directs activities onto the MPP game service panel, and the plasma monitor card table display. It is important to note that all communications are direct from the game display processor, freeing up resources available to the game engine processor.

Figure 10:
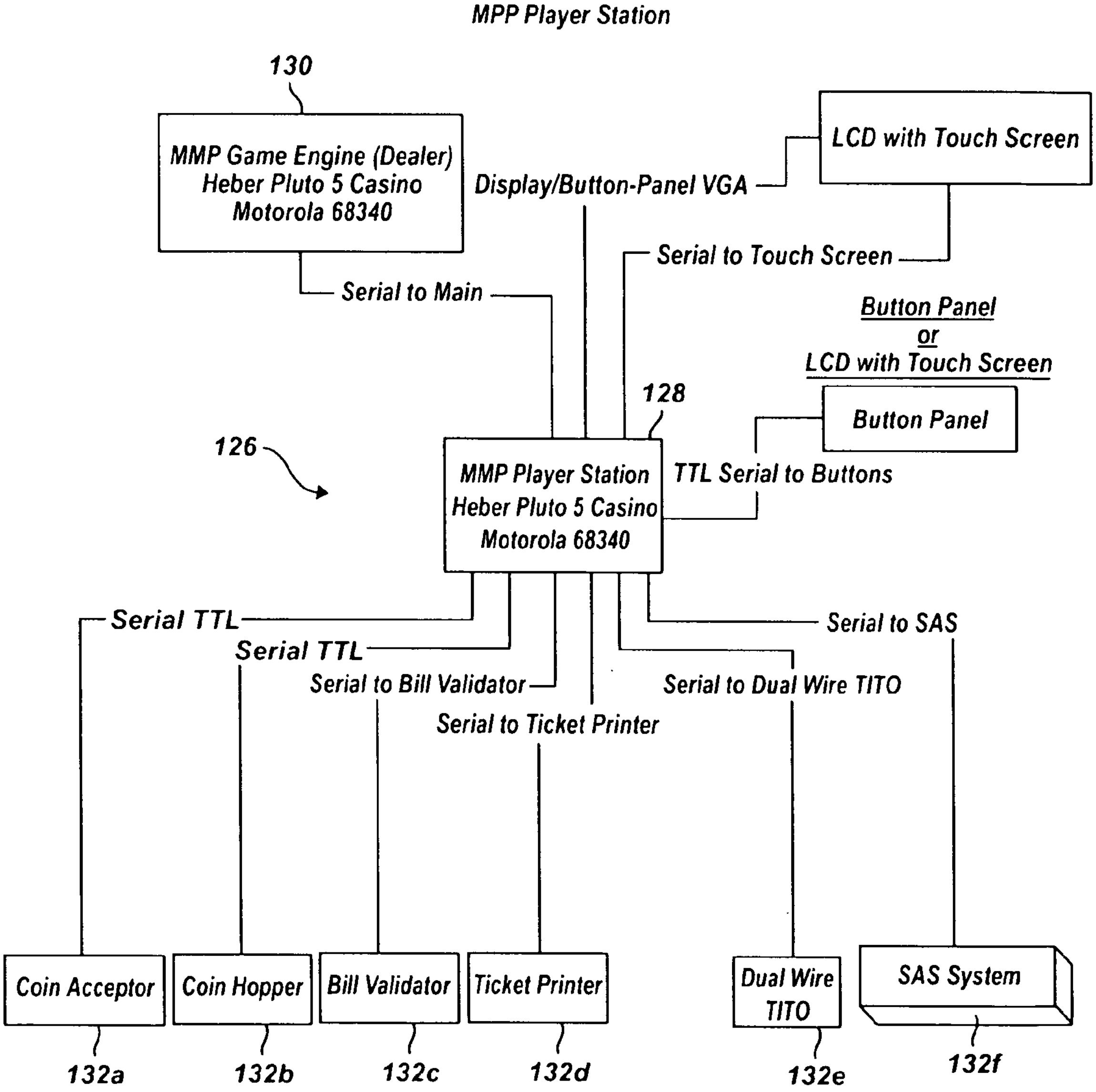
FIG. 10 shows a schematic diagram of a player station useful in the practice of the present invention.

FIG. 10 shows the electronic/processing schematics 126 of the MPP player station intelligence board 128 (Heber Pluto 5 Casino, Motorola 68340), each of which player stations (one for each player position) is in direct connection to the MPP game engine 130 (dealer), which is in turn directly connected to the PC platform (not shown in this figure). Each intelligence board 128 receives information for all player input systems **132*a*-132*f* specific to that player station, such as the shown coin acceptor, coin hopper, bill validator, ticket printer, touch screen and/or display button panel, dual wire ticket-in-ticket-out printing and SAS system (SAS is one exemplary standard communications protocol used by a number of casinos central computer systems.) A significant benefit resides in the use of the independent intelligence boards 128 at each player position being in direct communication with the MPP game engine 130**, as opposed to each individual player position button panel being dead or inactive until authorized by the main game processor, as previous automated gaming systems were constructed.

The above-described architecture is also an improvement in providing a system with not only the intelligence at each player position, but also in redistributing processing capability for functions among various processing components within the gaming system. In one architectural format, all functions of the gaming engine, except for the player localized intelligence functions, are consolidated into a single PC (e.g., the PENTIUM® 4 shown in the figures). This would include all game functions, player video functions, dealer video functions, dealer audio functions, security, central reporting (to a casino's central computer, for example), currency and debit functions, alarm functions, lighting functions, and all other peripherals on the system, except for the localized player functions. Alternatively, all functions requiring communication with the casino's main computer system are located on the player station intelligent boards. In this system, the main game processor would talk directly with the player intelligent boards, preferably in the same novel communication format described below.

Figure 11:
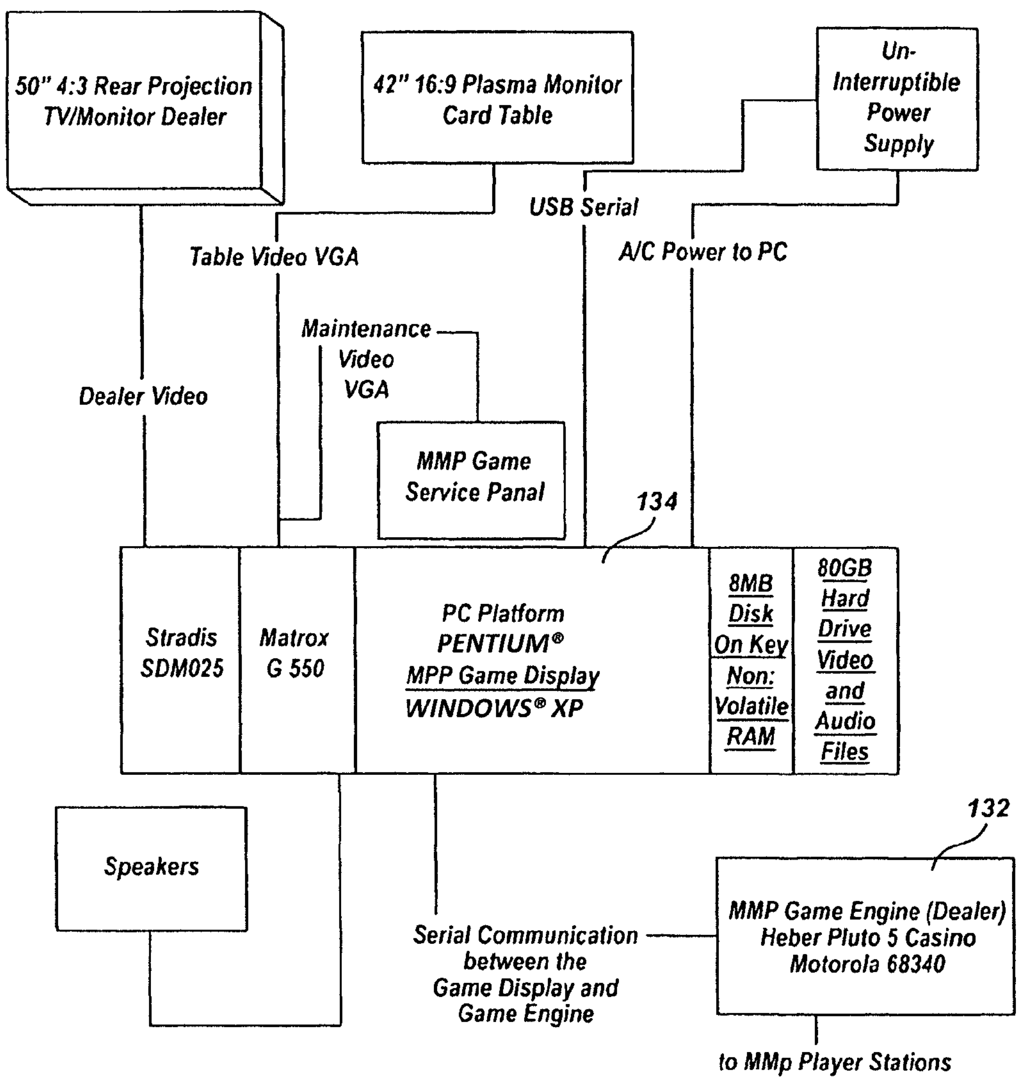
FIG. 11 shows a schematic diagram of a game display useful in the practice of the present invention.

An alternative system is shown in FIG. 11, where there is a dealer engine processor 132 intermediate the main game PC 134 and the Player intelligent boards (not shown). Both systems are a distinct improvement over the prior art, but with the higher power available for PCs, and with the ease of programming a PC as opposed to an embedded system, the consolidation of the game functions and the ability of the main game engine to communicate with each of the player positions is enabled. As shown in FIG. 11, the game display processor 134 is preferably a PENTIUM® 4 PC and is separate from the main processor 132. With the player intelligent boards, the main game PC can receive packets of information from each player station as events occur rather than having to poll each player position on a regular basis 100 times to gain the specific information for each player input that may be made.

A description of the Heber board (an exemplary board that can be used as a player station processor and/or game engine processor 132) a commercially available intelligent processing board is as follows. The Heber board is known for its reliability and flexibility, especially for the Pluto 5 family of gaming products. The Pluto 5 is the controller of choice for the global gaming industry. Flexibility comes from a set of features built into the Pluto 5 (Casino) controller, and from the choice of optional add-on boards that can be used to adapt the Pluto family to best suit individual applications. In the area of interfacing, there are three distinct boards, each of which serves a particular function in helping the Pluto 5 to connect with the world outside:

RS485 Board

RS485 is an industrial-grade board for linking multiple systems in unforgiving circumstances for centralized information gathering. The Heber RS485 board is fully opto-isolated to provide complete circuit safety when used within "electrically noisy" environments. The RS485 board uses a single RS232 connection to the Pluto 5 board and all necessary power is also derived through this link. Two-header connectors may be provided for the RS485 channel to allow daisy chain connections between multiple systems.

HII/ccTalk Board

This board specializes in communicating with industry standard note/coin acceptors and payout hoppers. Equipped with dual communication channels, each port is configurable to use either the HIT format to connect with MARS™ coin/note acceptors or the ccTalk format for MONEY CONTROLS™ hoppers. Both channels are controlled via a single RS232 connection to the Pluto 5 board and all necessary power is also derived through this link. The Heber FastTrack package contains modular library functions for passing information via these channels.

Four-Channel Relay Board

The relay board allows control of medium- to high-level loads such as solenoids, without risk of damage or interference to the Pluto 5 circuitry. Four power-switching channels are available with absolute isolation from the Pluto 5 control signals. Each relay is capable of switching direct or alternating currents of up to 7 A at a maximum voltage of 250 V.

Like the Pluto 5 board itself, its modular options have been used extensively so that their designs are fully developed and entirely stable. The options that are specified are consistently provided in mass quantities. As with all Pluto products, programming for the modular options is straightforward. This is enhanced with the use of the Pluto 5 Enhanced Development Kit and also the FastTrack package. Between them, these kits contain all of the low-level and high-level programming tools and library functions needed for gaming applications. These systems can be provided through a Pluto 5 Enhanced Development Kit datasheet 80-15353-7 (Heber Limited, Belvedere Mill, Chalford, Stroud, Gloucestershire, GL6 8NT, UK Tel: +44 (0) 1453 886000 Fax: +44 (0) 1453 885013, which may be located on the world-wide web at heber.co.uk. Specifications for the various boards are identified below.

RS485 Interface
- Host Interface
- RS232 connection to Pluto 5/Pluto 5 Casino
- All power provided via RS232 link from host system
- Communication Port
- Dual four-way Molex 0.1" KK headers for daisy chaining purposes
- Dimensions
- 80 mm×61 mm (3.14"×2.4")
- Part Number
- Opto-isolated RS485 board
- 01-14536-2

HII/ccTalk Interface
- Host Interface
- RS232 connection to Pluto 5/Pluto 5 Casino
- All power provided via RS232 link from host system
- Communication Port
- Single or dual ten-way header connectors
- Dimensions
- 101.6 mm×69.85 mm (4"×2.8")
- Part Number
- Dual channel HII/ccTalk board
- 01-16171-2

Four-Channel Relay Board
- Host Interface
- Connection to Pluto 5/Pluto 5 Casino via ribbon cable using four standard output lines
- All power provided via ribbon cable link from host system
- Switching Capabilities
- Up to 250 V AC or DC @ 7 A maximum per channel
- Dimensions
- 80 mm×61 mm (3.14"×2.4")
- Part Number
- Four-channel relay board
- 01-15275-1
- 80-16949-1

One proposed hardware configuration uses a "satellite" intelligent processor at each player position. The player station satellite processor is substantially the same as the primary game engine processor, a Heber Pluto 5 Casino board. The satellite processors receive instruction from the primary game engine but then handle the communications with player station peripherals independently. Each satellite processor communicates with only the peripherals at the same player station. Thus, each player station has a dedicated satellite processor communicating with only the peripherals at the same player station and with the casino's central computer system. The peripherals are, but not limited to: slot accounting systems, bill validator, ticket printer, coin acceptor, coin hopper, meters, button panel or LCD touch screen and various doors and keys.

The satellite processors run proprietary software to enable functionality. The player station software is comprised of two modules, the first being an OS similar to the game engine Operating System and the second being station software that handles peripheral communications. The software may be installed on EPROMs for each satellite processor. The primary method of communication between the satellite processors and the primary game engine is via serial connectivity and the previously described protocol. In one example, information packets are prepared by the satellite processors and are sent to the game engine processor on the happening of an event.

The proposed game engine provides communication to the player stations to set the game state, activate buttons and receive button and meter information for each player station. Communication is via a serial connection to each of the stations. The new protocol for communication between the game engine, game display and player stations is an event driven packet-for-packet bi-directional protocol with Cyclic Redundancy Check (CRC) verification. This is distinguished from the Sega system that used continuous polling. This communication method frees up resources in the same engine processor because the processor no longer needs to poll the satellites continuously or periodically.

The new protocol uses embedded acknowledgement and sequence checking. The packet-for-packet protocol uses a command packet, response packet and a synchronization packet as illustrated below. The protocol uses standard ASCII characters to send data and a proprietary verification method.

Format of Command Packet

| STX | SEQ | DATA LENGTH | DATA | CRC-16 | ETX |
|---|---|---|---|---|---|
| 1 | 1 | 3 | 3-999 | 5 | 1 |

Format of Response Packet

| STX | SEQ | DSP | PRV | ETX |
|---|---|---|---|---|
| 1 | 1 | 1 | 1 | 1 |

Format of Synchronization Response Packet

| STX | MTS | MRS | ETX |
|---|---|---|---|
| 1 | 1 | 1 | 1 |

Key to Tables (above)

| | |
|---|---|
| STX | Start of Packet Character |
| SEQ | Sequence # (Cycles from "0" thru "9") |
| LEN | Length of Data Area ("003" thru "999") |
| DATA | ASCII Data Fields separated with "\|" character |
| CRC | CRC-16 Value ("0000" thru "65535" Cyclic Redundancy Check |
| ETX | End of Packet Character |
| DSP | Disposition Code ("A" ACK, "N" NAK, or "I" Invalid Sequence) |
| PRV | Sequence Number of Last ACK'ed Packet (0 thru 9) |
| MTS | Main's Current transmit Sequence Number |

The command packet and response packet are used during primary game communications. The protocol uses redundant acknowledgement. For example, the packet is initially acknowledged when first received by the recipient. The same recipient will resend another acknowledgement in the next communication. This second acknowledgement is the "PRV" data in the response packet.

The communications between the game engine and player station intelligence is preferably a transaction-based protocol. Either device can start a transaction, which is why it is essential that there be an intelligent board at each player position. All packets of information may be sent in any acceptable format, with ASCII format preferred as a matter of designer choice. All command packets usually contain a sequence number that is incremented after each successful packet exchange. The game engine and the player station intelligence use sequence numbers that are independent of each other. The sequence number keeps the communications in synchronization. This synchronization method is described below.

The command packet is used to send various commands such as inputs, lamps, doors, errors, chirp, game results, player input, coin acceptance, player identification, credit acceptance, wagers, etc. . . . The command packet format may be, by way of a non-limiting example:

<STX><Sequence number><Data Length><Data><CRC-16><ETX>

The data format with in the command packet may be:

<Address><Command><Field 1>|<Field 2>|<Field n>|

The response packet format may be:

<STX><Sequence number><Disposition><Previous ACK><ETX>

The sync request packet format may be:

<SYN>

The sync response packet format may be:

<STX><Mains Current Transmission Sequence><Mains Current Receive Sequence><ETX>

A major strength of the protocol is its resilience of the game protocol and its ability to free up resources within the game engine. Those resources can, in turn, be used to provide more intricate games, and multi-media affects.

The satellite and host must become synchronized in order to provide for reliable communications using packet numbers. To facilitate this, a novel protocol synchronization method is used. Upon applying power to the satellite, or after a communications failure, the satellite automatically enters into synchronization mode. In the synchronization mode, the satellite sends out the ASCII SYN (0x16) character about every second. It is expecting a special response packet containing transmit and receive packet sequence numbers to be used from that point on. After receiving the special response packet, the sequence numbers are used "as-is," and are not incremented until a successful packet exchange is completed. After communications are synchronized, the sequence numbers are incremented after each packet is successfully sent or received.

As was noted before, the main game processor may contain information, data, programming and other necessary functions to enable the play of multiple games off the same machine. For example, the main game engine may have rules and commands that will enable play a variety of blackjack, poker, and other card games. The system may be controlled so that different games may be played at different times on command of the casino or players.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An automatic multiple player interactive gaming machine, comprising:

a plurality of player terminals; and a central game processor programmed to execute an interactive multiple player game that is configured to display a player set of cards on a display of the player terminal, each player set of cards being logically linked with a dealer set of cards such that cards are removed from each individual player set of cards when a corresponding card is dealt to the dealer from the dealer set of cards.

2. The automatic multiple player interactive gaming machine of claim 1, further comprising a virtual dealer display.

3. The automatic multiple player interactive gaming machine of claim 1, wherein the central game processor is further programmed to display player hands dealt from the individual player sets of cards on individual player displays associated with an individual player terminal of the plurality of player terminals.

4. The automatic multiple player interactive gaming machine of claim 1, wherein the central game processor is further programmed to display player hands dealt from the individual sets of cards on a common game displays that is common to the plurality of player terminals.

5. The automatic multiple player interactive gaming machine of claim 1, wherein each of the respective individual player sets of cards comprises multiple decks of cards.

6. The automatic multiple player gaming apparatus of claim 1, wherein each player terminal of the plurality includes at least one physical card shoe configured to read physical cards from the associated individual player set of cards as the physical cards are to leave the at least one physical card shoe, wherein the central game processor is further programmed to indicate to the at least one physical card shoe which dealer cards are to be removed from the associated individual player set of cards.

7. The automatic multiple player gaming apparatus of claim 1, wherein each player terminal of the plurality includes at least one electronic display for displaying an individual player hand from the associated individual player set of cards, wherein the central game processor is further programmed to indicate which dealer cards are to be removed from the associated individual player set of cards during computer simulation of dealing the individual player hand to the player terminal.

8. An automatic multiple player interactive gaming machine comprising:

a central game processor;

multiple player terminals, each player terminal including at least one player input;

a common game display; and a game program residing in the central game processor, wherein the game program is configured to cause the central game processor to execute an interactive multiple player game, wherein the central game processor is further programmed to display individual hands of cards, wherein each hand of cards is randomly selected from its own individual set of cards, wherein the game program is further configured to cause the central game processor to display a dealer hand of cards, wherein the dealer hand of cards is randomly selected from its own individual set of cards, wherein the game program is further configured to cause the central game processor to display common cards, and wherein each displayed common card is removed from each individual set of cards.

9. The automatic multiple player interactive gaming machine of claim 8, wherein the common cards are dealt from a set of cards separate from each individual set of cards.

10. The automatic multiple player interactive gaming machine of claim 9, wherein each card limning a common card group is removed from each individual set of cards.

11. A method of providing a card-wagering game using an interactive gaming machine, the method comprising:

randomly dealing by the interactive gaming machine a respective plurality of player hands of cards to at least two players, wherein each respective plurality of player hands of cards is selected from a separate player set of cards associated with a separate player;

dealing by the interactive gaming machine a dealer hand of cards randomly selected from a dealer set of cards associated with a dealer, the dealer set of cards being separate from, and logically linked to, the player sets of cards such that cards are removed from each of the player sets of cards when a corresponding card is dealt to the dealer from the dealer set of cards;

receiving a respective wager from each of the at least two players;

determining, by the interactive gaming machine according to rules of the card-wagering game, which player has a winning hand based at least in part on their respective player hand of cards; and providing a payout amount to each player holding a winning hand according to a payout schedule associated with the card-wagering game.

12. The method of claim 11, wherein the game is blackjack.

13. The method of claim 11, wherein the game is poker.

14. The method of claim 11, wherein each player set of cards and the dealer set of comprises multiple decks of cards.

15. A method of dealing a plurality of hands of cards in a multiplayer card-wagering game using an interactive gaming machine, the method comprising:

associating by the interactive gaming machine a respective player set of cards associated with each player in the multiplayer card-wagering game;

dealing by the interactive gaming machine a respective player hand of cards to each of the players in the multi-player card-wagering game, wherein each respective player hand is randomly selected from the player set of cards respectively associated with each player; and dealing by the interactive gaming machine a dealer hand of cards randomly selected from a dealer set of cards, the dealer set of cards being separate from, and logically linked with, the sets of cards respectively associated with each player, such that dealing a card from one of the dealer set of cards and the player set of cards causes removal of a corresponding card in the other of the dealer set of cards and the player set of cards.

16. The method of claim 15, wherein the multiplayer card-wagering game is one of blackjack and poker.

17. A method of dealing a plurality of hands of cards in a multiplayer card-wagering game using an interactive gaming machine, the method comprising:

associating by the interactive gaming machine a respective set of cards with each player in the multiplayer card-wagering game;

dealing by the interactive gaming machine a respective hand of cards to each of the players in the multiplayer card-wagering game, wherein each respective hand is randomly selected from the set of cards respectively associated with each player;

dealing by the interactive gaming machine a dealer hand of cards randomly selected from a dealer set of cards, the dealer set of cards being separate from the sets of cards respectively associated with each player; and dealing a plurality of community cards randomly selected from the dealer set of cards, the dealer set of cards being separate from each of the sets of cards respectively associated with each player.

18. The method of claim 17, further comprising removing the plurality of community cards from each of the sets of cards respectively associated with each player.

19. A method of providing a card-wagering game, the method comprising:

randomly dealing a respective plurality of physical cards to at least two players, wherein each respective plurality of physical cards is selected from a separate player set of physical cards associated with each player;

dealing by an interactive gaming machine a dealer hand of cards randomly selected from a dealer set of cards, the dealer set of cards being separate from, and logically linked to, the separate player sets of physical cards such that physical cards in the separate player sets that correspond to dealt cards in the dealer hand are prohibited from being dealt to the at least two players;

receiving a respective wager from each player;

determining, according to rules of the card-wagering game, which player has winning hand based at least in part on their respective plurality of physical cards; and providing a payout amount to each player holding a winning hand according to a payout schedule associated with the card-wagering game.

* * * * *

UNITED STATES PATENT AND TRADEMARK OFFICE

CERTIFICATE OF CORRECTION

PATENT NO. : 8,475,252 B2
APPLICATION NO. : 11/809257
DATED : July 2, 2013
INVENTOR(S) : Daymon B. Savage and Roger M. Snow It is certified that error appears in the above-identified patent and that said Letters Patent is hereby corrected as shown below:

In the claims:

CLAIM 10, COLUMN 19, LINE 23, change “card limning a” to --card forming a--
CLAIM 14, COLUMN 19, LINE 51, change “set of comprises” to --set of cards comprises--
CLAIM 19, COLUMN 20, LINE 52, change “has winning” to --has a winning--

Signed and Sealed this
Twenty-ninth Day of September, 2015

Michelle K. Lee
*Director of the United States Patent and Trademark Office*